US010403299B2

(12) United States Patent
Wung et al.

(10) Patent No.: US 10,403,299 B2
(45) Date of Patent: Sep. 3, 2019

(54) MULTI-CHANNEL SPEECH SIGNAL ENHANCEMENT FOR ROBUST VOICE TRIGGER DETECTION AND AUTOMATIC SPEECH RECOGNITION

(71) Applicant: Apple Inc., Cupertino, CA (US)

(72) Inventors: Jason Wung, Los Angeles, CA (US); Joshua D. Atkins, Los Angeles, CA (US); Ramin Pishehvar, Culver City, CA (US); Mehrez Souden, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 15/613,127

(22) Filed: Jun. 2, 2017

(65) Prior Publication Data

US 2018/0350379 A1    Dec. 6, 2018

(51) Int. Cl.
| | |
|---|---|
| *H04M 9/08* | (2006.01) |
| *G10L 21/02* | (2013.01) |
| *G10L 21/0208* | (2013.01) |
| *G10L 21/0216* | (2013.01) |
| *G10L 21/0232* | (2013.01) |
| *G10L 21/0272* | (2013.01) |
| *G10L 21/038* | (2013.01) |

(52) U.S. Cl.
CPC ...... *G10L 21/0205* (2013.01); *G10L 21/0232* (2013.01); *G10L 21/0272* (2013.01); *G10L 21/038* (2013.01); *G10L 21/0208* (2013.01); *G10L 2021/02082* (2013.01); *G10L 2021/02166* (2013.01); *H04M 9/082* (2013.01)

(58) Field of Classification Search
CPC ............... H04M 9/082; G10L 2021/02; G10L 2021/02166; G10L 21/0205
See application file for complete search history.

(56) References Cited

U.S. PATENT DOCUMENTS

| | | | |
|---|---|---|---|
| 7,734,466 B2 | 6/2010 | Barron et al. | |
| 2003/0026437 A1* | 2/2003 | Janse | ..................... H04R 3/005 381/71.4 |

(Continued)

OTHER PUBLICATIONS

Delcroix, Marc, et al., "Speech recognition in living rooms: Integrated speech enhancement and recognition system based on spatial, spectral and temporal modeling of sounds", *Computer Speech and Language* 27, (May 1, 2013), 851-873.

(Continued)

*Primary Examiner* — Samuel G Neway
(74) *Attorney, Agent, or Firm* — Womble Bond Dickinson (US) LLP

(57) ABSTRACT

A digital speech enhancement system that performs a specific chain of digital signal processing operations upon multi-channel sound pick up, to result in a single, enhanced speech signal. The operations are designed to be computationally less complex yet as a whole yield an enhanced speech signal that produces accurate voice trigger detection and low word error rates by an automatic speech recognizer. The constituent operations or components of the system have been chosen so that the overall system is robust to changing acoustic conditions, and can deliver the enhanced speech signal with low enough latency so that the system can be used online (enabling real-time, voice trigger detection and streaming ASR.) Other embodiments are also described and claimed.

18 Claims, 14 Drawing Sheets

(56) References Cited

U.S. PATENT DOCUMENTS

| | | | | |
|---|---|---|---|---|
| 2015/0117649 A1* | 4/2015 | Nesta | .................... | H04R 3/005 381/17 |
| 2015/0279352 A1* | 10/2015 | Willett | .................... | G10L 15/30 704/231 |
| 2017/0171396 A1* | 6/2017 | Sun | ........................ | H04B 3/235 |
| 2017/0309294 A1* | 10/2017 | Gannot | ............... | G10L 21/0232 |
| 2017/0365255 A1* | 12/2017 | Kupryjanow | ......... | G10L 21/034 |
| 2018/0220007 A1* | 8/2018 | Sun | ....................... | H04M 9/082 |
| 2018/0350379 A1* | 12/2018 | Wung | ................. | G10L 21/0205 |

OTHER PUBLICATIONS

Doclo, Simon, et al., "Frequency-Domain Criterion for the Speech Distortion Weighted Multichannel Wiener Filter for Robust Noise Reduction", *Speech Communication*, vol. 49, Issues 7-8, (Jul. 1, 2007), 43 pages.

Doclo, Simon, et al., "On the Output SNR of the Speech-Distortion Weighted Multichannel Wiener Filter", *IEEE Signal Processing Letters*, vol. 12, No. 12, (Dec. 1, 2005), 809-811.

Gelbart, David, et al., "Double the Trouble: Handling Noise and Reverberation in Far-Field Automatic Speech Recognition", *ICSI*, (Jul. 1, 2002), 4 pages.

Gerkmann, Timo, et al., "Improved a posteriori Speech Presence Probability Estimation Based on a Likelihood Ratio with Fixed Priors", *IEEE Transactions on Audio, Speech, and Language Processing*, 16(5), (Jul. 1, 2008), 1-10.

Haykin, Simon O., "The recursive least-squares (rls) algorithm", *Adaptive Filter Theory*, 5th Edition, (Jan. 1, 2013), 433-455.

Jukic, Ante, et al., "Group Sparsity for MIMO Speech Dereverberation", *IEEE Workshop on Applications of Signal Processing to Audio and Acoustics*, (Oct. 18-21, 2015), 5 pages.

Jukic, Ante, et al., "Multi-Channel Linear Prediction-Based Speech Dereverberation with Sparse Priors", *IEEE/ACM Transactions on Audio, Speech, and Language Processing*, vol. 23, No. 9, (Sep. 1, 2015), 1509-1520.

Kim, Taesu, et al., "Blind Source Separation Exploiting Higher-Order Frequency Dependencies", *IEEE Transactions on Audio, Speech, and Language Processing*, vol. 15, No. 1, (Jan. 1, 2007), 70-79.

Ono, Nobutaka, "Auxiliary-function-based Independent Vector Analysis with Power of Vector-norm Type Weighting Functions", *APSIPA*, (Dec. 3-6, 2012), 4 pages.

Ono, Nobutaka, "Stable and Fast Update Rules for Independent Vector Analysis Based on Auxiliary Function Technique", *IEEE Workshop on Applications of Signal Processing to Audio and Acoustics*, (Oct. 16-19, 2011), 189-192.

Rontogiannis, Athanasios A., et al., "Householder-Based RLS Algorithms", *QRD-RLS Adaptive Filtering*, J.A. Apolinario Jr. (Ed.), (Jan. 1, 2009), 181-203.

Souden, Mehrez, et al., "An Integrated Solution for Online Multichannel Noise Tracking and Reduction", *IEEE Transactions on Audio, Speech, and Language Processing*, vol. 19, No. 7, (Sep. 1, 2011), 2159-2169.

Souden, Mehrez, et al., "Gaussian Model-Based Multichannel Speech Presence Probability", *IEEE Transactions on Audio, Speech, and Language Processing*, vol. 18, No. 5, (Jul. 1, 2010), 1072-1077.

Souden, Mehrez, et al., "On Optimal Frequency-Domain Multichannel Linear Filtering for Noise Reduction", *IEEE Transactions on Audio, Speech, and Language Processing*, vol. 18, No. 2, (Feb. 1, 2010), 260-276.

Stokes, Jack W., et al., "Robust RLS with Round Robin Regularization Including Application to Stereo Acoustic Echo Cancellation", *ICASSP*, (May 1, 2006), 736-739.

Taniguchi, Toru, et al., "An Auxiliary-Function Approach to Online Independent Vector Analysis for Real-Time Blind Source Separation", *4th Joint Workshop on Hands-free Speech Communication and Microphone Arrays* (HSCMA), (May 12-14, 2014), 107-111.

Yoshioka, Takuya, et al., "Dereverberation for Reverberation-Robust Microphone Arrays", *Proceedings of the 21st European Signal Processing Conference* (EUSIPCO 2013), (Sep. 1, 2013), 1-5.

Yoshioka, Takuya, et al., "Generalization of Multi-Channel Linear Prediction Methods for Blind MIMO Impulse Response Shortening", *IEEE Transactions on Audio, Speech, and Language Processing*, vol. 20, No. 10, (Dec. 1, 2012), 2707-2720.

Yoshioka, Takuya, et al., "The NTT CHiME-3 System: Advances in Speech Enhancement and Recognition for Mobile Multi-Microphone Devices", *ASRU*, (Dec. 13-17, 2015), 436-443.

Apple Inc. "Online Multichannel Signal Processing with Multiple Output Streams for Far-field Siri on the HomePod," Feb. 28, 2018, 14 pages.

* cited by examiner

- Given some initialization of the separation and channel matrices, perform the following steps at frame t
  - For echo source n in {1..N}
    - Update voice activity factor update $$r_n(t) = \sqrt{\sum_f |w_{n,f}^H(t-1)y_f(t)|^2}$$

- Update square root of the nth covariance matrix inverse $$Q_{n,f}(t) = \lambda^{-1/2}Q_{n,f}(t-1) + \frac{z_{n,f}(t)u_{n,f}^H(t)}{1+d_{n,f}(t)}$$

where $$u_{n,f}(t) = (1-\lambda)^{1/2}r_n^{(\beta-2)/2}(t)Q_{n,f}^H(t-1)y_f(t)$$

$$d_{n,f}(t) = (1+\|u_{n,f}(t)\|^2)^{1/2}$$

$$z_{n,f}(t) = -\lambda^{1/2}\frac{Q_{n,f}(t-1)u_{n,f}(t)}{d_{n,f}(t)}$$

- Update the nth row of the separation matrix $$p_{n,f}(t) = Q_{n,f}^H A_{:,n,f}(t)$$

$$w_{n,f}(t) \leftarrow \frac{Q_{n,f}p_{n,f}(t)}{\|p_{n,f}(t)\|}$$

- Update the estimates of the channel matrix using rank 1 update for lower complexity $$A_f(t) \leftarrow W_f^{-1}(t)$$

- Apply minimum distortion principle and separate sources $$x_f(t) \leftarrow \text{diag}[A_f(t)]W_f(t)y_f(t)$$

FIG. 9

Convergence of the PMWF can be slow during the adaptation period
Solution: obtain more robust estimates of the target speech and acoustic noise statistics, thereby leading to more robust denoising system

- for t=1... (time frames)
  - Initial estimates of the covariance matrices (microphone signal $y$, noise signal $v$, and speech signal $x$)

$$\Phi_{yy}(t) = \lambda\Phi_{yy}(t-1) + (1-\lambda)y(t)y^H(t)$$
  $$\Phi_{vv}(t) \leftarrow \Phi_{vv}(t-1)$$
  $$\Phi_{xx}(t) \leftarrow \Phi_{yy}(t) - \Phi_{vv}(t)$$

- for i=1...I (number of microphone signals)
    • Update clean signal estimate (Householder Recursive Least Squares-type inversion used)

$$\hat{x}(t) \leftarrow W^H y(t)$$
    $$W = \frac{\Phi_{vv}^{-1}(t)\Phi_{xx}(t)}{1 + Trace(\Phi_{vv}^{-1}(t)\Phi_{xx}(t))}$$

• Update clean signal Power Spectrum Density (PSD) matrix estimate $$\Phi_{xx}(t) \leftarrow \lambda\Phi_{xx}(t-1) + (1-\lambda)\hat{x}(t)\hat{x}^H(t)$$

• Update Multichannel-Speech Presence Probability (SPP) including MVAD (claim 1)
    • Update the noise covariance matrix (and its inverse)

$$\Phi_{vv}(t) \leftarrow \lambda_v\Phi_{vv}(t-1) + (1-\lambda_v)y(t)y^H(t)$$
    $$\lambda_v = \lambda + (1-\lambda)p(\Phi_{xx}(t), \Phi_{vv}(t), y(t))$$

- Estimate clean speech using final estimates of clean speech and noise PSD matrices

FIG. 11

1) • Additive noise model: $\mathbf{y} = \mathbf{x} + \mathbf{v}$
   - $\mathbf{x}$ = speech (non-stationary) signal
   - $\mathbf{v}$ = noise (stationary) signal 2) • PMWF with rank-1 assumption: $\hat{\mathbf{x}} = \left( \dfrac{\mathbf{R}_{vv}^{-1}\mathbf{R}_{yy} - \mathbf{I}}{\beta + \mathrm{tr}\{\mathbf{R}_{vv}^{-1}\mathbf{R}_{yy}\} - M} \right)^H \mathbf{y}$

- Denominator term introduces gain scaling, potentially distorting the speech signal
   - However, gain scaling gives lower noise floor at the output 3) • Multi-channel Wiener filter (MCWF) for stationary noise extraction: $\hat{\mathbf{x}} = \left(\mathbf{R}_{yy}^{-1}\mathbf{R}_{xx}\right)^H \mathbf{y} = \left[\mathbf{R}_{yy}^{-1}\left(\mathbf{R}_{yy} - \mathbf{R}_{vv}\right)\right]^H \mathbf{y}$
   $= \mathbf{y} - \left(\mathbf{R}_{yy}^{-1}\mathbf{R}_{vv}\right)^H \mathbf{y}$
   $\Rightarrow \hat{\mathbf{v}} = \left(\mathbf{R}_{yy}^{-1}\mathbf{R}_{vv}\right)^H \mathbf{y}$, noise extraction filter

- No gain scaling in the estimated noise term
   - $\mathbf{R}_{vv}$ is assumed to be stationary in the first iteration of SPP ($\mathbf{R}_{vv}[n] = \mathbf{R}_{vv}[n-1]$)
   - Rank-1 assumption is still used in SPP
   - Less likely to cancel speech signal with subtraction
   - Less sensitive to mis-estimation of SPP

FIG. 13

- SPP with rank-1 assumption: $p[n] = \left[1 + \dfrac{q[n]}{1-q[n]}\left(1+\hat{\xi}[n]\right)\exp\left(\dfrac{-\hat{\beta}[n]}{1+\hat{\xi}[n]}\right)\right]^{-1}$

- SPP with full rank: $\Lambda = \dfrac{1-q}{q}\dfrac{p[Y|H_1]}{p[Y|H_0]}$ $p[Y|H_1] = \dfrac{1}{\pi^M \det\{R_{yy}\}}\exp\left\{-y^H R_{yy}^{-1} y\right\}$ $p[Y|H_0] = \dfrac{1}{\pi^M \det\{R_{vv}\}}\exp\left\{-y^H R_{vv}^{-1} y\right\}$ $\Rightarrow \Lambda = \dfrac{1-q}{q}\dfrac{\det\{R_{vv}\}}{\det\{R_{yy}\}}\exp\left\{y^H R_{vv}^{-1} y - y^H R_{yy}^{-1} y\right\}$ $p = \left[1 + \dfrac{1}{\Lambda}\right]^{-1}$

- Gram-Schmidt orthogonalization decomposes the covariance matrices $R_{yy} = K_y^H D_y K_y$
  - $K_y$ is a triangular matrix, $D_y$ is a diagonal matrix
  - $\det\{R_{yy}\}$ is the product of the diagonal terms in $D_y$
  - $y^H R^{-1}_{yy} y$ is obtained for free after the Gram-Schmidt orthogonalization

FIG. 14

MULTI-CHANNEL SPEECH SIGNAL ENHANCEMENT FOR ROBUST VOICE TRIGGER DETECTION AND AUTOMATIC SPEECH RECOGNITION

FIELD

An embodiment of the invention relates to digital signal processing techniques suitable for use in consumer electronics or automotive electronics, for enhancing a multi-channel speech signal to improve voice trigger phrase detection and reduce word error rate when the enhanced speech signal is processed by an automatic speech recognizer. Other embodiments are also described.

BACKGROUND

In many late model consumer electronics devices such as desktop computers, laptop computers, smartphones, and tablet computers, there are multiple sound pick up channels in the form of two or more microphones. These produce mixed audio signals, which contain sounds from various or diverse sources in the acoustic environment, e.g., two or more talkers in the room along with a speakerphone and some ambient background noise (e.g., air conditioning), during a group conference call. Also, when a talker in a room is sufficiently far away from the microphones (e.g., in the far-field), the room reverberation muddies the speech signal produced by the microphones, resulting in increased word error rates by an automatic speech recognizer (ASR.) Dereverberation techniques have been proposed that use multi-channel linear prediction (MCLP) to predict the undesired reverberant components in the microphone signals, which are then removed before passing the microphone signals on to further processing (and ultimately, to the ASR.) An example is MCLP using the recursive least squares (RLS) algorithm. But prior art solutions are too complex to be easily "tuned" for a given application, and can be numerically unstable, especially for some online (real-time) ASR applications such as a voice triggered intelligent personal assistant (virtual assistant.) The virtual assistant needs to both accurately and rapidly detect an initial voice trigger phrase so that it can respond with reduced latency. To achieve natural human-machine interaction, the virtual assistant should be able to produce and display each recognized word immediately after it has been spoken, but it also has to remain numerically stable to avoid frustrating the user, while being computationally light so as to be implementable in a device such as a smartphone that has limited computing resources.

SUMMARY

An embodiment of the invention is a digital speech enhancement system that performs a specific chain of digital signal processing operations upon a multi-channel sound pick up, to result in a single, enhanced speech signal. In one embodiment, certain components of the signal processing chain are designed to be computationally less complex than conventional techniques in speech enhancement applications. Furthermore, those components remain both accurate and robust to changing acoustic conditions, enabling the system to deliver the enhanced speech signal with low enough latency so that the system can be used "online" (enable real-time, voice trigger detection and ASR to be performed upon the enhanced speech signal), while remaining accurate and robust.

In one embodiment, an acoustic echo canceller receives M (two or more) microphone signals and removes the echo therein (or reduces the echo therein), to produce M echo-cancelled signals. These are then processed by a dereverberation (de-reverb) processor. A multi-channel noise reducer (or noise suppressor) then removes noise from (or reduces the acoustic noise in the) M dereverberated signals. Next, a beamforming processor produces a single beamformed signal from the M noise-reduced signals. A residual echo suppressor removes any residual echo from (reduces residual echo in) the beamformed signal. A blind source separation (BSS) processor produces M or fewer source signals, from the M dereverberated signals. A speech stream selector selects one of the M or fewer source signals or the residual echo suppressed signal, as being the most likely to contain an ASR voice trigger phrase or as being suitable for input to an ASR.

In one embodiment, the dereverberation processor is configured to remove reverberation from (remove reverberation in) its multi-channel input signal, using a recursive least square lattice (LSL) structure to update an adaptive, multi-channel linear prediction (MCLP) filter coefficient matrix using only prior instances of a multi-channel microphone signal input vector. This makes the dereverberation process both causal and less complex from a computational standpoint, as compared to using a batch-based process, and also more stable compared to a recursive least squares, RLS, algorithm), and as a result contributing to the ability to run the system in an online application (enabling a downstream ASR or voice trigger detector to receive the enhanced speech signal as each word is spoken by a talker.)

The dereverberation processor may also be configured with additional features that improve robustness, by enabling it to track changes in acoustic conditions (e.g., multiple talkers moving around) and yet remain numerically stable (e.g., updates to the coefficients of the adaptive digital filters remain well behaved.) This may be due to the use of the recursive modified Gram-Schmidt matrix orthogonolization procedure, and the added capability of dynamically changing the order of the adaptive MCLP filter coefficient matrix over time (e.g., as frequently as each update to the adaptive MCLP filter coefficient matrix.) The latter in particular means that the prediction filter is not only time varying, but its length can also change, on a per frame basis (e.g., as often as the input signal vector is updated), to automatically adapt to the amount of reverberation and potentially avoid creating unnecessarily large covariance matrices, which could result in numerical inaccuracy or instability.

In one embodiment, the noise reducer has a multi-channel parametric Wiener filter that suppresses the background noise from the dereverberated signals. The Wiener filter is updated (its filter coefficients are computed) based on a speech presence probability (SPP), and the latter in turn is computed based on an a priori speech presence probability (a priori SPP.) The latter is computed by a multi-channel voice activity detector (MVAD), whose two input thresholds are dynamically adapted and are derived from i) an instantaneous a priori signal to noise ratio (SNR), and ii) an average a priori SNR, of the multi-channel dereverberated signal. The input thresholds to the MVAD, and ultimately the Wiener filter, are thus tracking the observed multi-channel noise thereby providing a robust solution.

In one embodiment, the BSS processor uses a Householder transformation-based independent vector analysis routine (Householder recursive least square-based independent vector analysis), for source separation, in which only the square root of the covariance matrix inverse of each source is updated to provide more numerical stability and convergence speed than the prior art.

The above described signal processing chain, and the specific adaptive filter estimation algorithms mentioned above, have been shown to be more effective than a few other signal processing chains and filter estimation algorithms, in reducing the word error rate of subsequent ASR, even during changing acoustic environments (e.g., even if one of the microphones is noisy or occluded), while also enabling an online or real-time delivery of the enhanced speech signal to a voice trigger detector or to the subsequent ASR.

In some embodiments, certain components of the signal processing chain described above may be used in other applications, and as such can be stand-alone aspects of the invention. For example, the de-reverb processor featuring the LSL algorithm may be used in an ambience extraction process, to extract late reverberation tails in a previously recorded musical or audio-visual work (for purposes of spatial audio rendering of the ambience content.) The noise reducer can also be a stand-alone embodiment of the invention, having applicability anywhere that audible noise is to be removed from a speech signal, without unduly distorting the speech. The noise extracted by the noise reducer can also be used in an ambience extraction process for sound rendering. The signals extracted by the BSS can also be used for acoustic scene analysis and sound rendering applications.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

FIG. 9 shows an example algorithm for the process flow of FIG. 8.

FIG. 11 shows an algorithm for obtaining more robust estimates of the target speech and acoustic noise statistics by an iterative PMWF.

FIG. 13 shows the results of derivations for stationary noise extraction by the noise suppressor.

FIG. 14 shows how to derive speech presence probability with a full rank covariance matrix.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
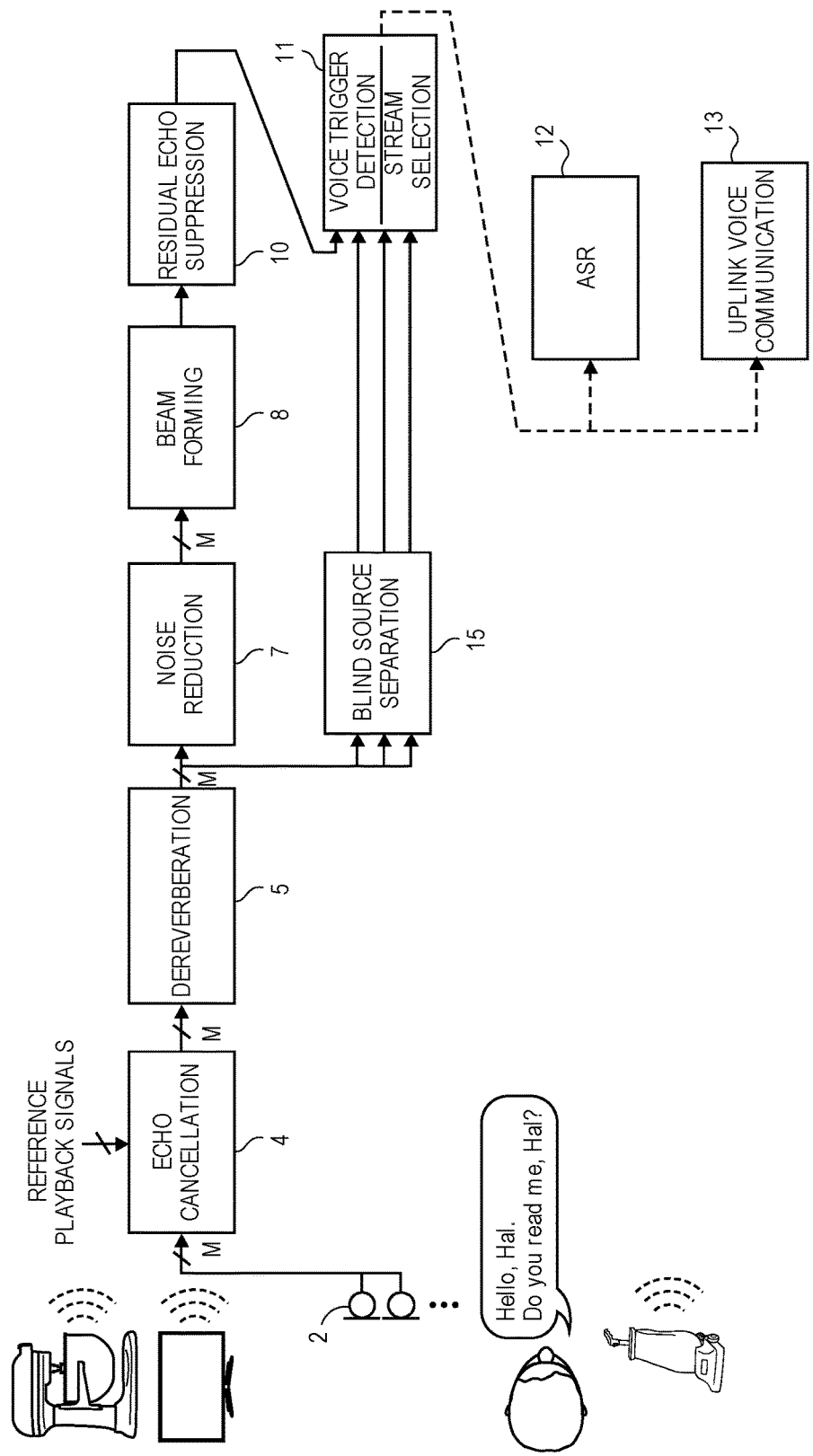
FIG. 1 is a block diagram of a multi-channel digital speech signal enhancement system.

FIG. 1 is a block diagram a multi-channel digital speech signal enhancement system. It may be part of an audio system that captures speech of a talker (using the example, "Hello, Hal. Do you read me, Hal?"), and especially where the talker is located in a far field of the two or more microphones 2 that are picking up sound for example in a room or inside a vehicle where the audio system resides. In one embodiment, all of components shown may be implemented as one or more data processing components (generically referred to here as "a processor") that execute instructions stored in solid state memory, inside an external housing of a smartphone, a tablet computer, a laptop computer, a desktop computer, a speaker dock, a stand-alone wireless loudspeaker cabinet, or an in-vehicle infotainment system (all of which are generically referenced here as media playback devices.) In another embodiment, the automatic speech recognizer (ASR 12) may be in a remote server which receives the selected speech stream via a transmission over the Internet.

When a talker is in the far field, room reverberation muddies the speech signal produced by the microphones, resulting in increased word error rate by the ASR 12. As explained in the Background section above, this is but one of the challenges presented by an online or real time ASR application, such as a voice triggered intelligent personal assistant (virtual assistant.) The components of the audio system depicted in FIG. 1 have been carefully selected and implemented as digital signal processing components that together enable recognition of the output, enhanced speech signal with reduced word error rate, as well as robustness (against changing acoustic conditions such as non-stationary speech in the ambient environment of the microphones 2 including the presence of multiple talkers and noise sources.) At the same time, this pre-processing solution is an online or real-time solution, that can take place before a voice trigger (phrase) is recognized, enabling the system to be used for a "streaming" ASR application where each word that is recognized may immediately appear on a screen soon (e.g., less than a second) after it is spoken by the talker. In other words, a voice trigger detection routine (e.g., part of a voice trigger detection/stream selection block 11) need not wait for an entire command phrase to be completed by the talker, before being able to output the recognized words for display. The enhanced speech signal that is provided to the ASR 12 contains portions or chunks of the words that are spoken, as they are being spoken, without having to wait for an entire phrase to be completed. Such online pre-processing may also help the ASR to better perform end point detection and energy normalization (end pointing algorithm). Furthermore, the addition of a blind source separation processor (BSS 15) allows extracting potentially multiple competing sound sources and enables the virtual assistant to recognize speech in the presence of competing talkers or other spatially directional sound noise sources.

The signal processing chain begins with an acoustic echo canceler 4 that receives a number M>=2 microphone signals, from M microphones 2, and removes echo therein electronically, using for example any suitable linear or nonlinear adaptive filter process that computes an adaptive filter that may represent the transfer functions of the channels, between each sound source (e.g., loudspeaker input) and the multi-channel sound pick up by the microphones 2. The adaptive filter process relies on reference signals that represent the "echo" that is to be removed from the multi-channel sound pickup, in this case being playback signals that contain audio that is being outputted or converted into sound by a loudspeaker of the audio system (not shown.) When there is no media playback by the media playback device, e.g., no playback audio output from a media player application program, and no downlink communication audio output by a telephony or video conferencing application program stored in the media playback device, the echo canceler 4 (and a residual echo suppressor 10, described below) may be "skipped" or disabled in the signal processing chain shown in FIG. 1.

Next, the echo cancelled signals are provided to a dereverb processor (de-reverb 5) which reduces reverberation in the echo cancelled signals, so as to produce M dereverberated signals. Doing so facilitates subsequent noise reduction, beamforming, and blind source separation since the channel impulse responses computed in those operations are shortened (due to the shortened, de-reverberated microphone signals.) More details on a particularly effective approach for the de-reverb 5 are given below.

The de-reverb signals are then processed to remove noise therein, by a noise reducer (noise reduction 7), details for which are also given below. The noise reduction 7 tracks and suppresses stationary ambient (background) noises using the multiple (dereverberated) microphone signals. The resulting M noise reduced signals are then provided to a beamforming processor 8 that produces a single pickup beam signal from the M noise reduced signals. In one embodiment, the beamforming processor 8 coherently combines the multichannel noise-reduced microphone signals, for constructive summation into a single, target or desired signal. The beamforming processor 8 may be configured to have knowledge of the relative positions of the microphones 2, based on for example an assumption that the microphones 2 form a microphone array whose inter-microphone spacing and orientation are known to the beamforming processor 8. The latter enables a pickup beam to be "aimed" at a given direction and having a given beam width. An external process (not shown) can provide the beamforming processor 8 the direction and beam width information, based on for example having analyzed sensor inputs to determine the position of a talker relative to a front axis of the microphone array. Any suitable sound pickup beamforming algorithm may be used.

Next, a residual echo suppressor 10 removes from the pickup beam signal residual echo that was present in the echo cancelled signals and that was not suppressed by the de-reverb 5 and the noise reduction 7. In one embodiment, a previously trained deep neural network (trained using for example hundreds of hours speech and residual examples) may be used for this purpose, to further enhance the audio stream at the output of the beamforming processor by suppressing the residual echo.

The system may also include a blind source separation processor (BSS 15) that produces a number of source signals (M or fewer) from the M dereverberated signals, separating the mixed signals in the multi-channel pickup into distinct source signals. In particular, the input to the BSS 15 may be taken just upstream of the noise reduction 7, as shown. In this manner, artifacts that might be introduced by the noise reduction 7 are avoided by the BSS algorithm. The BSS 15 separates competing directional sound sources, for example interference from a television, another sound playback device, or another talker in the same acoustic or ambient environment.

The source signals produced by the BSS 15 and the single pickup beam produced at the output of the residual echo suppressor 10 are provided to a speech stream selector 11, where the latter may analyze these input signals (e.g., based on their individual signal to noise ratio, SNR) and select one of them as containing an ASR voice trigger phrase, or as being the one most suitable for input to the ASR 12. The selector 11 may assign a score to each of the audio streams at its input, by for example a deep neural network that has been previously trained to detect a trigger phrase, e.g., "Hey Hal." Each score quantifies the likelihood of the presence of the trigger phrase in its respective stream, the stream with the highest score is selected and passed to the ASR engine. In another embodiment, the speech stream selector 11 makes its decision based on criteria that are more suitable for providing an uplink voice communications signal (to an uplink voice communication block 13), e.g., looking for the stream that has the greatest speech intelligibility metric. The selected stream is then prepared (e.g., encoded, packetized), by the communication block 13, for uplink into a communications network (e.g., a cellular telephone network, a voice over Internet protocol telephony network).

Dereverberation

The digital signal processing performed by the de-reverb processor (de-reverb 5) may be in sub-band (frequency) domain, where each sub-band or frequency bin is processed independently. A multi-channel speech pickup is received, which may, in the example system of FIG. 1, be the M echo-cancelled signals, also referred to here as an input signal vector or observation vector, y[n], having a length M. The input signal vector may be a short time Fourier transform, or other sub-band version of a current chunk or frame (nth, in time) of a multi-channel audio discrete-time sequence (e.g., where each frame or chunk may be 10-50 msec long.) The past L instances of the input signal vector y (e.g., y[n], y[n−1], . . . y[n−L−1]) are concatenated and represented as xL[n], a vector having a length M*L (for each sub-band.) The selection of L is important as explained below, as it also determines the order or length of the adaptive filter that is being estimated, and hence the complexity of the estimation problem. The de-reverb 5 is configured to compute an output signal vector that contains less reverberation than the input signal vector y, by estimating an adaptive filter G[n] and then using it to extract the reverberation, as follows.

The output signal vector may be computed as a product of
i) a conversion factor r[n] computed as a function of a) a gain vector k[n] which is based on a product of the inverse of a spatially averaged output power estimation, an inverse correlation matrix P[n], and the concatenation xL[n] of L, old instances of the input signal vector y[n], and b) xL[n], and
ii) an a priori error zeta[n] that is computed based on a difference between a new instance of the input signal vector y[n] and the concatenation xL[n] weighted by an old instance of a multi-channel linear prediction, MCLP, filter coefficient matrix G[n].

The de-reverb 5 is configured to compute a new instance of the matrix G[n] in response to a new instance of the input signal vector y, wherein the new instance of the matrix G[n] is computed as a difference between
   i) an old instance of the matrix G, and
   ii) a product of
      a. the a priori error and
      b. the gain vector k,
   and wherein the inverse correlation matrix P is computed using a recursive least squares algorithm. For complexity reduction and numerical stability purposes, the calculation of P may be transformed into a least squares lattice (LSL) structure, which solves P indirectly through a weighted forward linear prediction error covariance matrix F[n] and a weighted backward linear prediction error covariance matrix B[n] This advantageous approach can be used in the dereverberation process of flow of FIG. 2.

Figure 2:
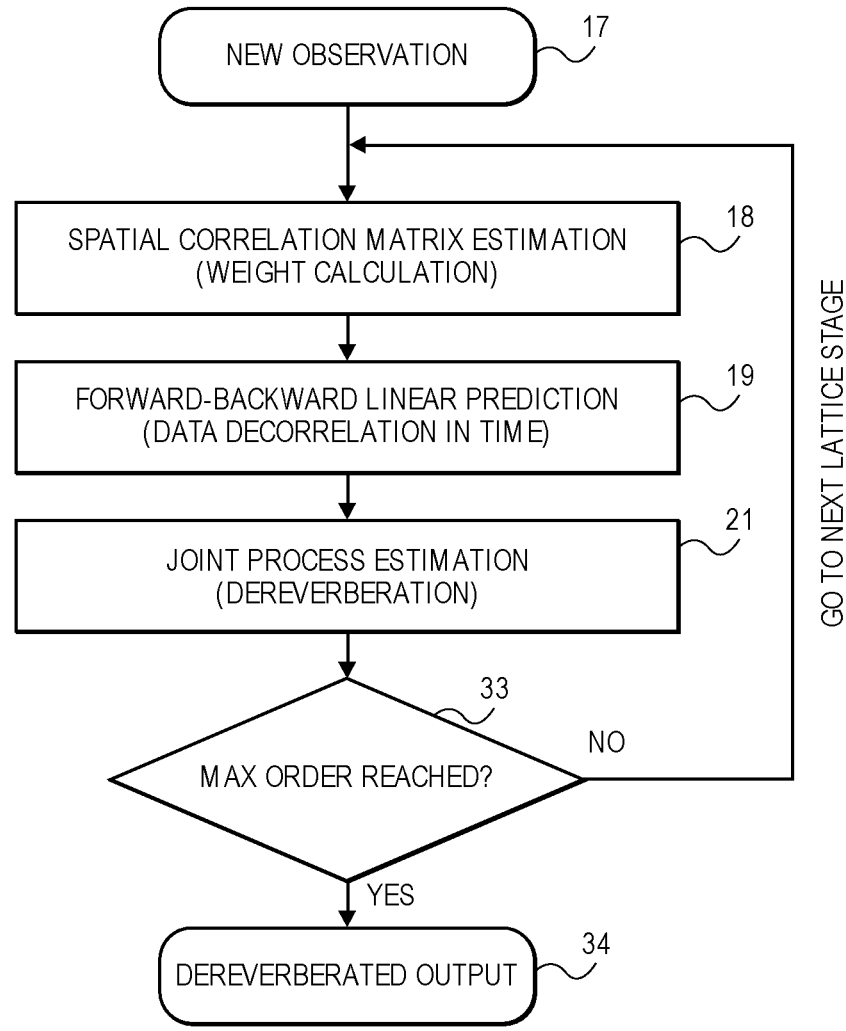
FIG. 2 is a flow diagram of a dereverberation process that uses a multi-channel least square lattice (LSL) algorithm for estimating an inverse covariance matrix.

FIG. 2 is a flow diagram of a dereverberation process that uses a multi-channel LSL algorithm for estimating an inverse covariance matrix, as modified here to instead estimate the inverse correlation matrix P as described in Appendix A. For each new observation (operation 17), including the input signal vector y[n] and xL[n], the following operations are performed for each stage of the least square lattice structure. First, a spatial correlation matrix estimation (operation 18) is computed, and the weight for the reweighted cost function of MCLP is calculated. As an example, see Appendix B, equations 40-48.

Next (in the current lattice stage), a forward-backward linear prediction is performed to de-correlate the matrix data in time (to compute a diagonalized covariance matrix, so that a smaller inverse covariance matrix can be solved for each filter tap). This is represented as operation 19, and details can be seen in Appendix B, equations 49-72.

Next, the process continues with a joint process estimation (operation 21) which actually de-reverberates the input signal vector using the latest update to the filter coefficient matrix G[n]. The joint process estimation details are given by an example, in Appendix B in equations 73-85.

Next, if the predicted order l has reached a limit (a maximum value), then the de-reverberated output is provided as the output of the de-reverb 5 (operation 34). If however the maximum order has not yet been reached (operation 33), then the process moves to the next lattice stage and repeats operations 18-21 to estimate larger covariance matrices. Note that the process flow of FIG. 2 is different from a conventional LSL algorithm, at least because the spatial correlation matrix estimation and weight calculation (operation 18) has been added, for purposes of the reweighted cost function of MCLP.

Figure 3:
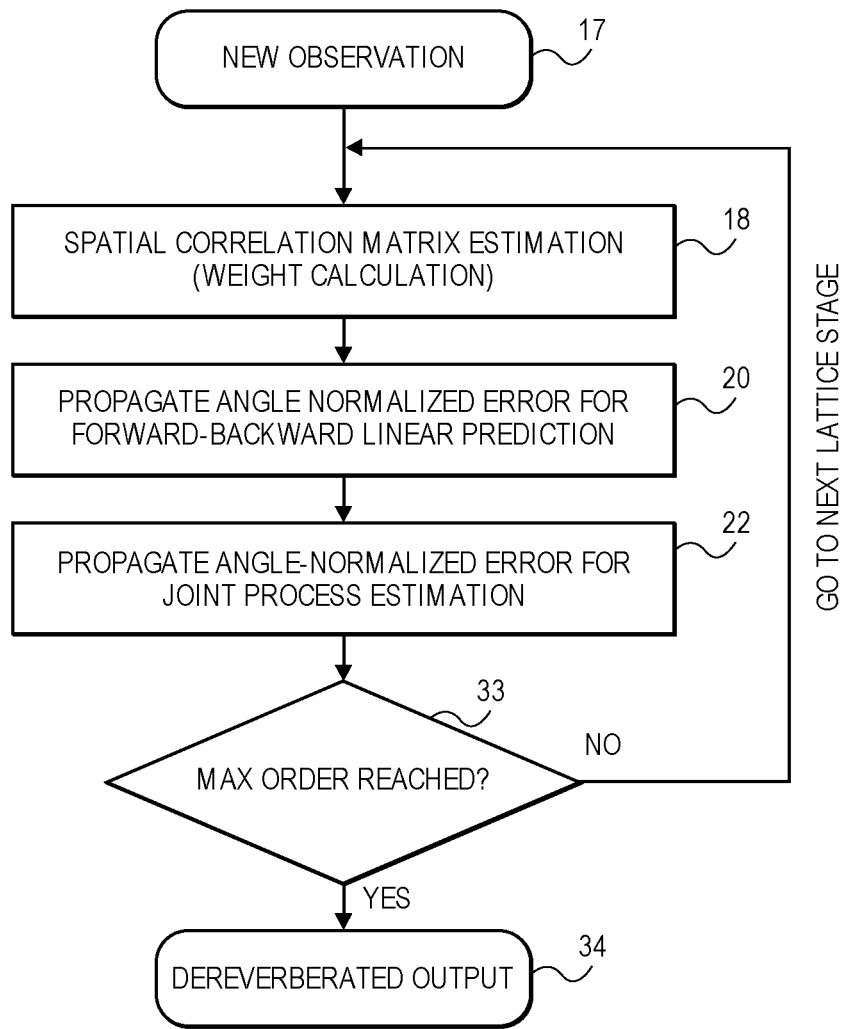
FIG. 3 depicts a flow diagram of another embodiment of the dereverberation process that uses the multi-channel LSL algorithm as modified with an angle-normalized error calculation.

The numerical robustness of the multi-channel LSL algorithm can be improved by introducing an angle-normalized error calculation. The process is modified as shown in FIG. 3, where the forward-backward linear prediction and joint process estimation operations 19, 21 of FIG. 2 have been modified to propagate angle-normalized error in each case (in operations 20 and 22 of FIG. 3). In other words, the de-reverb 5 computes the inverse correlation matrix P using the LSL structure, by in this case propagating angle-normalized error for forward-backward prediction, without using QR matrix decomposition wherein a cosine factor is calculated with error feedback when updating the reflection coefficients. This is in contrast to a conventional approach for calculating an angle-normalized error, which is through the use of QR decomposition that is intended to improve numerical performance at the expense of higher computational complexity. In accordance with an embodiment of the invention, a computationally efficient routine may be written to calculate the angle-normalized error without explicitly using the QR matric decomposition process. Furthermore, the routine may calculate a cosine factor with error feedback, as opposed to a traditional approach where a cosine factor is directly calculated in a traditional QR decomposition procedure. Updating the reflection coefficients with error feedback is numerically more robust than direct calculation, and is advantageously applied to the cosine factor calculation in this case.

While the multi-channel LSL algorithm with re-weighted cost function is a computationally efficient method to solve the multichannel dereverberation problem through MCLP, using a conventional approach to implement the multichannel LSL algorithm by propagating the a prior error, may lead to speech signal cancellation if the forgetting factor is too small or the filter order is to high, likely due to the ill-conditioning of the covariance matrices. The angle-normalized version of the algorithm as described above and whose derivation is given in detail in Appendix C) may alleviate the speech cancellation problem, even in the presence of ill-conditioned covariance matrices. Also, with the angle-normalized error, the speech distortion introduced by MCLP is less sensitive to the choices made in the tuning parameters, e.g., the forgetting factor, lambda, and the filter order.

Figure 4:
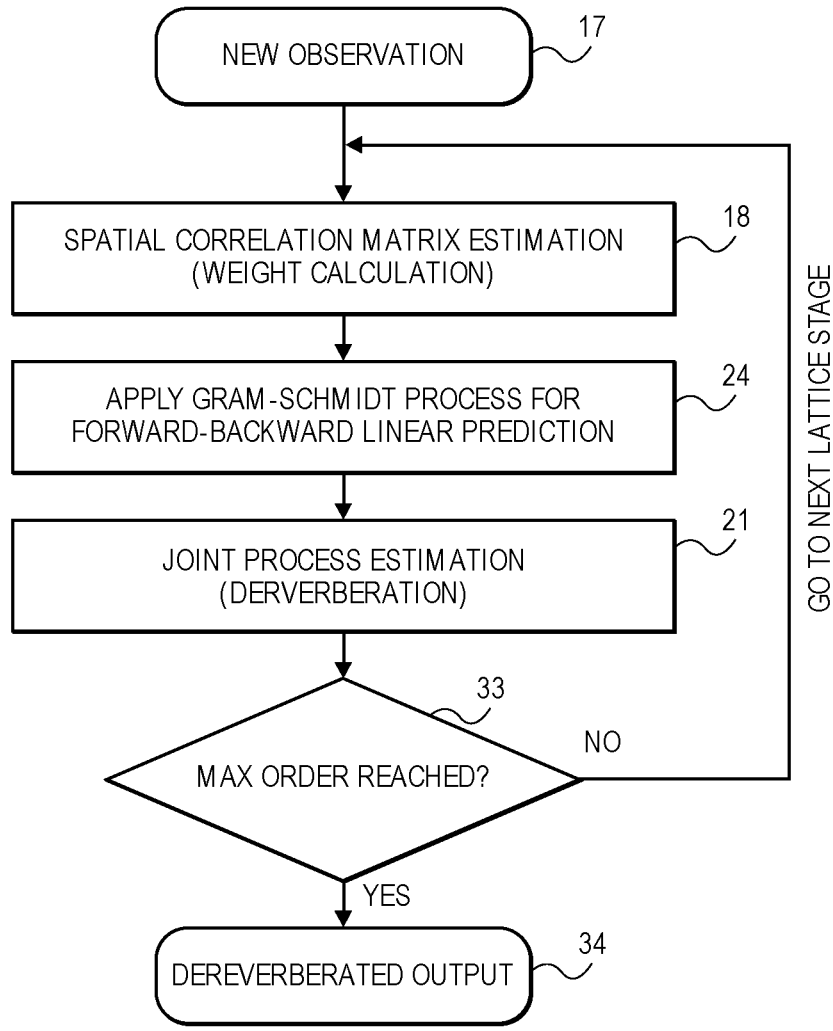
FIG. 4 depicts a flow diagram of another embodiment of the dereverberation process that uses the multi-channel LSL algorithm, modified to use a Gram-Schmidt orthogonolization process to implicitly solve for the inverse covariance matrices (with reduced computational complexity.)

When applying the LSL algorithm to the estimation problem here, in either embodiment of FIG. 2 or FIG. 3, the inverse covariance matrices (including matrix P) do need to be solved explicitly, and as a result require additional computational complexity. In accordance with another embodiment of the invention, the use of Gram-Schmidt orthoganalization is used to implicitly solve for the inverse covariance matrices, thereby requiring reduced computational complexity. In other words, the de-reverb 5 is configured to compute the inverse correlation matrix P using the LSL structure, by implicitly, not explicitly, solving the inverse correlation matrix P using a Gram-Schmidt orthoganalization process. This embodiment of the invention is depicted in the process flow of FIG. 4 where the process flow may be the same as that of FIG. 3 except that the forward-backward linear prediction (operation 19 in FIG. 3) has been modified into operation 24 in FIG. 4, wherein a Gram-Schmidt process is applied for making the forward-backward linear prediction. Using the Gram-Schmidt process, the full, inverse covariance matrices are transformed into triangular ones, thereby saving a number of matrix multiplications (that would otherwise have been required to calculate the inversion.) Note that the Gram-Schmidt process is a numerically stable inversion routine since positive-definiteness of the covariance matrices in this case is guaranteed. For a detailed derivation, see Appendix D.

Figure 5:
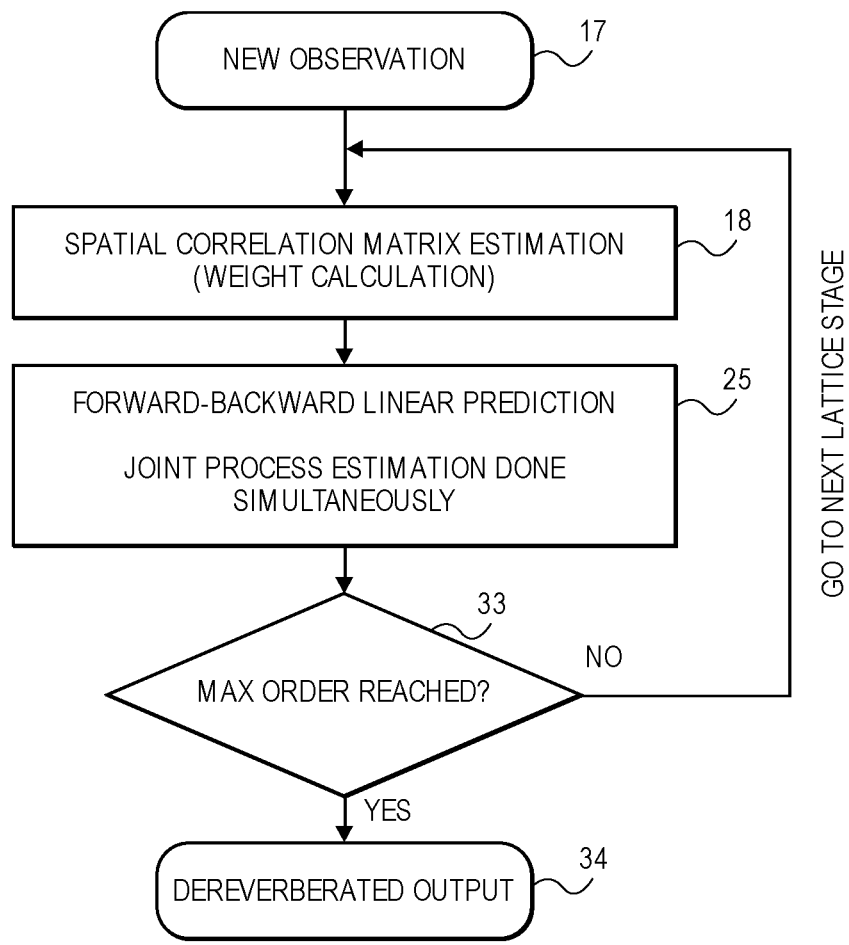
FIG. 5 depicts a flow diagram of another embodiment of the dereverberation process that uses the multi-channel LSL algorithm as modified with a computationally efficient method to jointly calculate the data orthogonalization and filtering.

The multi-channel LSL algorithm that contains a data orthogonalization process and a joint estimation (filtering) process, in operations 19 and 20 in FIG. 2, can be modified to further reduce computational complexity, by jointly calculating the data orthogonlization and the filtering (joint process estimation), as depicted in FIG. 5. More specifically, the process flow of FIG. 5 is similar to the one in FIG. 2 except that the forward-backward linear prediction (operation 19) and the joint process estimation (operation 20) are combined into a new operation 25 (see FIG. 5) in which the two are done essentially simultaneously. Specifically, when the delay of the MCLP is one, the solution to the joint process estimation is exactly the same as the solution to the forward linear prediction portion of the forward-backward linear prediction operation. A detailed derivation for this is given in Appendix E.

Figure 6:
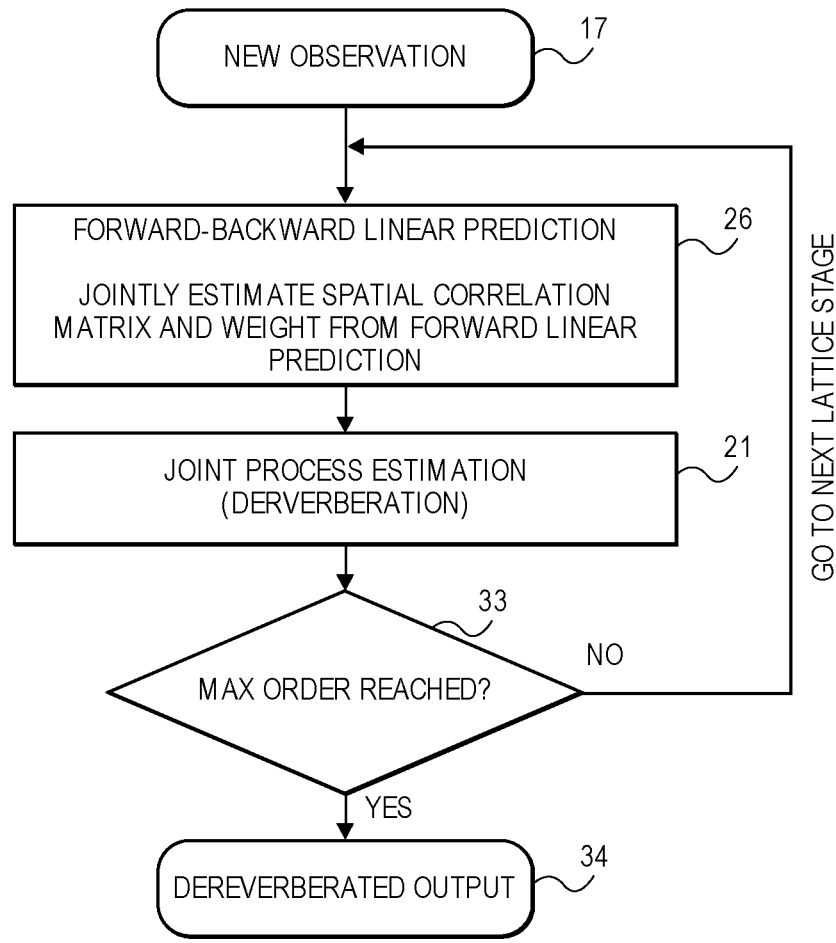
FIG. 6 depicts a flow diagram of another embodiment of the dereverberation process that uses the multi-channel LSL algorithm, modified to jointly estimate the inverse spatial correlation matrix with the forward linear prediction operation of the multi-channel LSL algorithm (for reduced computational complexity.)

Following the path of reducing the computational effort as enabled by the process flow in FIG. 5, FIG. 6 is a flow diagram of an alternative approach to improve computational efficiency of the multi-channel LSL algorithm, namely by recognizing that the MCLP as used for dereverberation requires the calculation of an inverse spatial correlation matrix of the past input frames (input signal vectors) using a reweighted cost function, and while one approach is to have a separate processing routine to calculate the inverse spatial correlation matrix to calculate the weights, an alternative presented now in connection with FIG. 6 is to jointly estimate the inverse spatial correlation matrix within the forward linear prediction operation (of the multi-channel LSL algorithm). Specifically, the two separate operations or routines in FIG. 2 of the spatial correlation matrix operation (weight calculation) in operation 18, and the forward-backward linear prediction (operation 19), may be combined into a single routine as operation 26 (in FIG. 6) where the spatial correlation matrix and weight from the forward linear prediction are jointly estimated. This is due to the fact that the inverse spatial correlation matrix is inherently computed as a by-product of the forward linear prediction operation. A detailed derivation of this approach is given in Appendix E.

Figure 7:
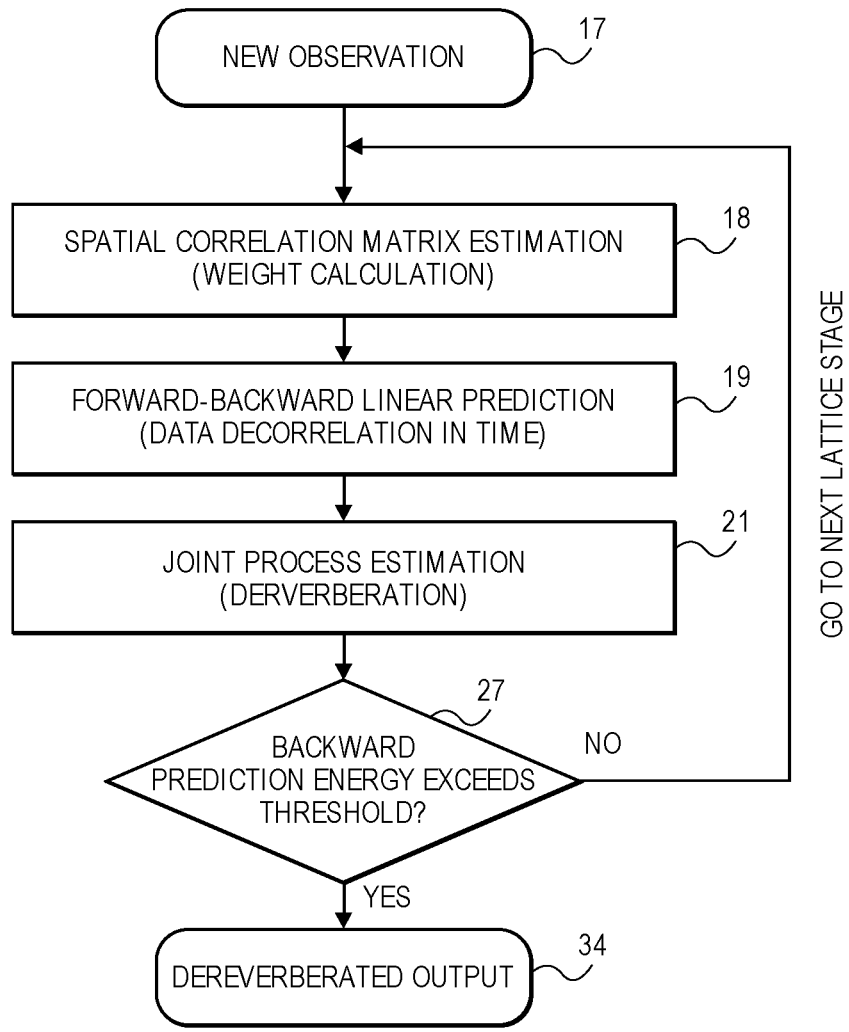
FIG. 7 depicts a flow diagram of another embodiment of the dereverberation process that uses the multi-channel LSL algorithm, modified to automatically select or limit the order of the inverse covariance matrix on a per lattice stage basis.

The multi-channel LSL algorithm depicted in the flow diagram of FIG. 2 has a decision operation 33 which determines whether the maximum order for the filter coefficient matrix has been reached following each LSL lattice stage, and if it has not then the next lattice stage is computed. In one embodiment, the maximum order may be fixed in advance of the algorithm beginning its operation, for example based on knowledge of the room acoustics; this maximum order is in a sense the "optimal" order for the covariance matrices, that is expected to yield "optimal" dereverberation performance. Now, in accordance with another embodiment of the invention, the de-reverb 5 is configured to change the length or order of the filter coefficient matrix (or covariance matrices), also referred to here as "filter order", based on monitoring the backward linear prediction energy. In other words, the backward prediction energy is monitored as an indicator of too high of an order, for the inverse covariance matrices. More specifically, when the backward prediction energy increases beyond a given threshold (operation 27 in FIG. 7), the de-reverb 5 stops its computation of higher order solutions for the re-weighted cost function. It is recognized that the backward prediction error energy grows exponentially once the optimum order has been reached, and so the threshold may be selected as being near the inflection point of a backward prediction energy curve (for example as computed in a simulation or laboratory setting.) The process will stop adapting to a higher order solution once the threshold in the backward prediction error energy is reached. For a detailed derivation of this approach, see Appendix F.

Blind Source Separation

Figure 8:
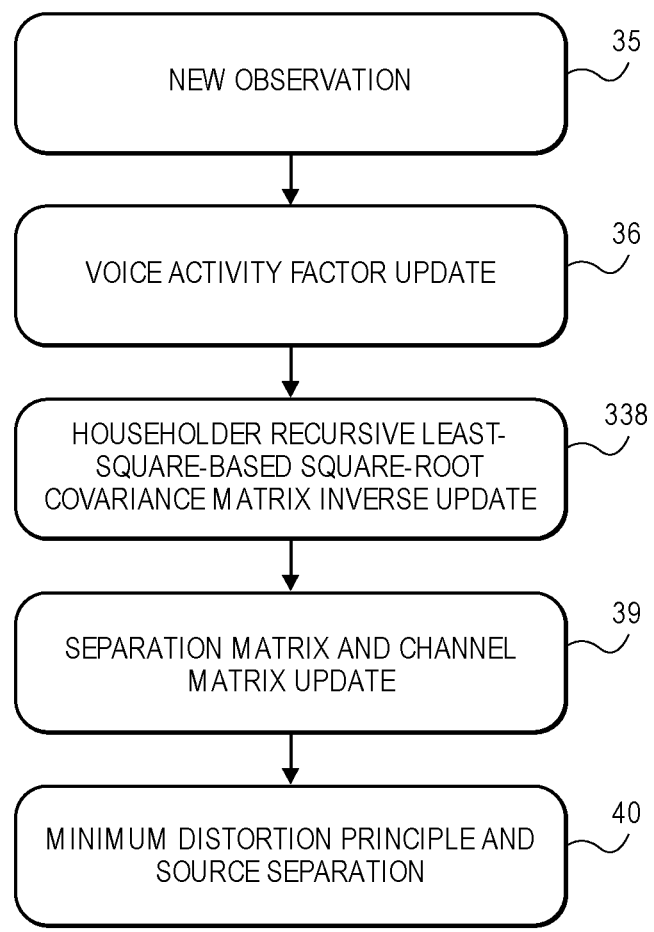
FIG. 8 shows a flow diagram of a blind source separation (BSS) process that uses independent vector analysis to find the sources, modified with recursive update of the square root of the inverse of the covariance matrix using a Householder transform.

Referring back to FIG. 1, the digital signal enhancement system has a blind source separation processor (BSS 15) that is tasked with producing M or fewer (at least two) source streams, by separating the source signals from the mixed signals (that are in the multi-channel input signal vector.) In other words, M or fewer concurrent audio signal are extracted from the M dereverberated signal. This is done without the aid of strong prior information about the source signals (other than the assumption that they are independent or sparse). In a conventional BSS algorithm, the mixed signals are separated by determining an un-mixing matrix (or source separation matrix) and then multiplying the un-mixing matrix by the multi-channel input signal vector, to obtain the source vector. FIG. 8 depicts a flow diagram of a process that is a modified version of a conventional BSS algorithm: a voice activity factor update (operation 36) is followed with a modification to a traditional, recursive least square based covariance matrix inverse update, the modification is in operation 38, in which a Householder recursive least square based square root covariance matrix inverse update is performed. This is followed by the usual separation matrix and channel matrix update (operation 39) and then the conventional minimum distortion principle and source separation (operation 40). In other words, the BSS 15 is now configured to use Householder recursive least square-based independent vector analysis for source separation, in which the square root of the covariance matrix inverse for each source is updated to gain both numerical stability and high convergence speed in the calculation of the source separation matrix (or source separation filter). Details of this approach are given in FIG. 9, where notably the update of the covariance matrix inverse has now been modified to be an update of the square root inverse matrix Q. This change also impacts the update of the separation matrix (operation 39), as shown by the equation for w.

Noise Reduction

Figure 10:
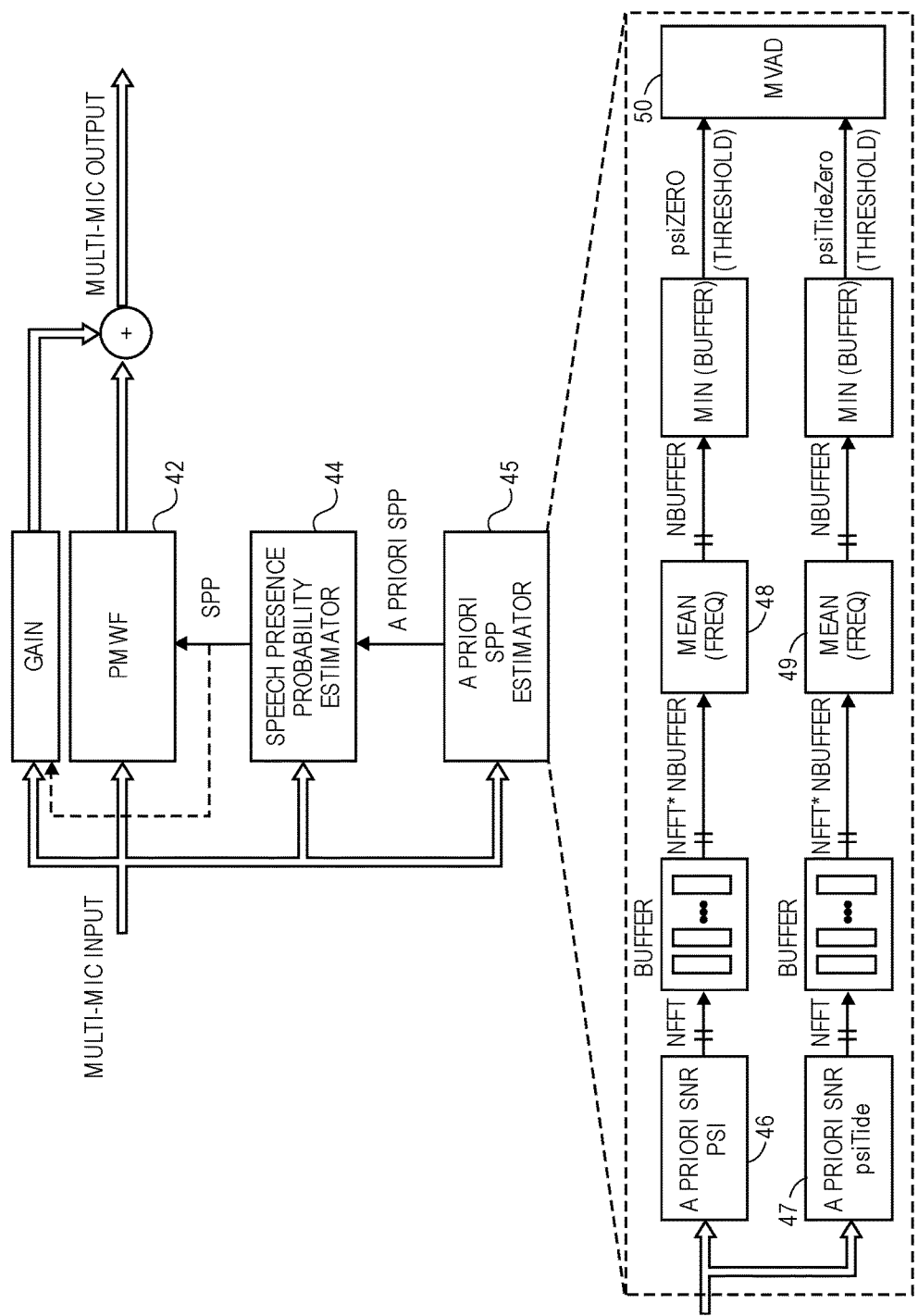
FIG. 10 is a block diagram of a parametric multi-channel Wiener filter (PMWF) based noise reducer that has automatic threshold selection for a MVAD.

There is a tradeoff between speech distortion and noise removal in any speech enhancement system. Referring now to FIG. 10, an embodiment of the invention uses a parametric multichannel Wiener filter (PMWF) 42 as well as a new a priori speech presence probability (SPP) estimator 45 to achieve less speech distortion and more noise removal, by the noise reduction 7 (see FIG. 1.) In particular, the PMWF 42 has a multi-channel filter input to receive the M dereverberated signals, and a multi-channel filter output that provides M noise reduced signals. A speech presence probability (SPP) estimator 44 receives an a priori speech presence probability, a priori SPP, from the a priori SPP estimator 45, and in response configures the filter coefficients of the PMWF 42 accordingly. The full adaptive formulation of the PMWF 42 may be derived as shown in Appendix G.

The SPP estimator 44 has a multi-channel voice activity detector (MVAD 50) that computes the a priori SPP, by comparing a) a multichannel SNR level at the plurality of dereverberated signals to b) first and second thresholds, wherein each threshold is being continuously updated by tracking the minima of the instantaneous and averaged multichannel SNRs at each sub-band. Each of the first and second thresholds, psiZero and psiTildezero, includes a number of sub-band thresholds each associated with a respective sub-band. A programmed processor (e.g., the one that implements the noise reduction 7) computes the two thresholds as follows:

a) the first threshold psiZero is computed from an instantaneous, e.g., for a single frame or input signal vector, a priori SNR psi (block 46 in FIG. 10), of the M dereverberated signals, and b) the second threshold, psiTildeZero, is computed from an average, e.g., several instantaneous a priori SNR values that have been smoothed over time, a priori SNR psiTilde (block 47 in FIG. 10) of the M dereverberated signals;

the instantaneous a priori SNR, psi, computed for multiple sub-bands are averaged across the sub-bands (by mean Freq block 48 in FIG. 10) and the sub-band having the smallest psi is found and that value of psi is then provided as psiZero (as the first threshold of the MVAD 50); and similarly the average a priori SNR, psiTilde, computed for multiple sub-bands are average across the sub-bands (by mean Freq block 49 in FIG. 10), and the sub-band having the smallest psiTilde is found and that value of psiTilde is then provided as psiTildeZero (as the second threshold of the MVAD 50.)

The above described process is an effective technique for automatically varying the two thresholds of the MVAD 50 so as to track the noise that has been picked up in a predefined number of past instances of the input signal vector (past frames of the multi-channel microphone signals), that generates less distortion and performs more noise removal than using a conventional, fixed speech absence probability (SAP) for configuring the coefficients of a PMWF.

In one embodiment, since the convergence of the PMWF 42 can be relatively slow during adaptation, a solution is to obtain more robust estimates of the target speech and acoustic noise statistics, thereby leading to a more robust de-noising (by the noise reduction 7.) An example is given in FIG. 11.

Figure 12:
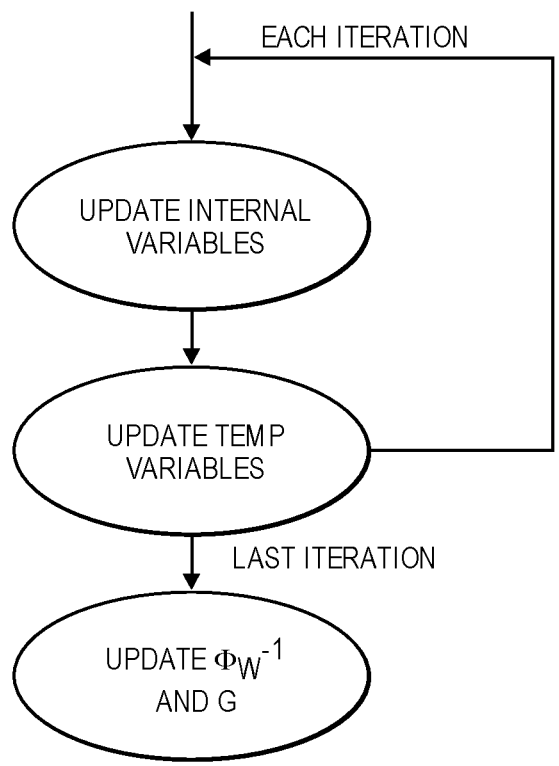
FIG. 12 is a process flow of an iterative speech presence probability algorithm having reduced computational complexity.

In yet another embodiment, a reduction in computational complexity of an iterative approach for calculating SPP (by the SPP estimator 44—see FIG. 10) may be obtained, as follows. In a conventional approach, computing the SPP needs updates of two covariance matrices, referred to as Phi_v v_inverse, Phi_x x, which is computationally expensive. A solution here is to introduce temporary variables that enable the iterative process to update its internal variables without performing a matrix-matrix multiplication. This means that there is no need to update the covariance matrix Phi_v v_inverse, and the filter coefficient matrix G (of the PMWF 42) until the last iteration. This process flow is depicted in FIG. 12. As a result, computational complexity is reduced from
(number of iterations)*$O((\text{number of microphones, M})^2)$
to
$O((\text{number of microphones, M})^2)$.

Turning now to FIG. 13, this figure provides derivations for stationary noise extraction that may be performed by the noise reduction 7. This is based on the additive noise model shown. In bullet point 2, a solution for the estimated clean speech x_hat is given based on the assumption that the PMWF has a rank-1 matrix. Such a filter is applied to the noisy signal v, to extract the estimated clean speech signal. Now, bullet point 3 is a new and improved solution for stationary noise extraction, in which the PMWF is assumed to have a full rank matrix. In that case, the equation for the estimated clean speech signal x_hat may be derived as shown, and the form of this equation allows the construction of a noise extraction filter; the latter can be computed using matrix estimation techniques, which can then be multiplied by the input noisy mixture vector y to result in an estimated stationary noise vector, v_hat. This stationary noise vector may then be subtracted from the input noisy mixture vector, y, to obtain the estimate for the clean speech x (which may be the noise reduced output of the noise reduction 7.)

FIG. 14 shows an alternative form of the SPP approach described earlier in connection with FIGS. 11 and 12, that uses a full rank assumption for the speech and noise covariance matrices.

In one embodiment, in the various algorithms that constitute the pre-processing as described above, the reduction in computational complexity, reduced latency, and increased robustness are obtained based on causal solutions for the respective adaptive filter estimation problems, which consider only a priori or past instances of an input signal vector that contains the speech pickup by the microphones 2.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, in addition to virtual assistant and uplink voice communications, there are other applications of the speech signal enhancement process, such as hearing aids. Also, while the dereverberation processes described above have been implemented as part of a virtual assistant (ASR based) system, to reduce acoustic mismatch between the microphones and the speech based acoustic model for speech recognition (while also improving speech recognition performance especially in a far field condition where the talker is in a far field of the microphones), other applications of the dereverberation process include ambiance extraction, where the multi-channel input signal is decomposed into its direct and early reflection portion and its late reverberation tail, where the latter represents the ambience content, and the decomposed signal is then post-processed in a spatial audio rendering system by panning the direct/early reflection signal and the late reverberation tail to different loudspeakers. The description is thus to be regarded as illustrative instead of limiting.

What is claimed is:

1. An audio system for digital speech signal enhancement, comprising:
   an acoustic echo canceller configured to reduce echo in a plurality of microphone signals, and produce a plurality of echo-cancelled signals;
   a dereverberation processor configured to reduce reverberation in the echo-cancelled signals, or in the microphone signals when there is no media playback, to produce a plurality of dereverberated signals;

a noise reducer configured to reduce noise in the plurality of dereverberated signals to produce a plurality of noise-reduced signals;

a beamforming processor configured to produce a pickup beam signal from the plurality of noise-reduced signals;

a residual echo suppressor configured to reduce residual echo in the pickup beam signal, and produce a residual echo suppressed signal;

a blind source separation (BSS) processor configured to extract a plurality of concurrent audio signals from the dereverberated signals; and a speech stream selector that is configured to select one of the plurality of concurrent audio signals or the residual echo suppressed signal.

2. The audio system of claim 1 wherein the dereverberation processor is to receive the echo-cancelled signals as an input signal or observation vector, and is configured to compute an output signal vector that contains less reverberation than the input signal vector, wherein the output signal vector is computed as a product of i) a conversion factor r[n], computed as a function of a) a gain vector k[n] which is based on a product of the inverse of a spatially averaged output power estimation, an inverse correlation matrix P[n], and a concatenation xL[n] of a plurality L of old instances of the input signal vector y[n], and b) xL[n], and ii) an a priori error zeta[n] that is computed based on a difference between a new instance of the input signal vector y[n] and the concatenation xL[n] weighted by an old instance of a multi-channel linear prediction, MCLP, filter coefficient matrix G[n], wherein the de-reverb processor is configured to compute a new instance of the matrix G[n] in response to a new instance of the input signal vector y, wherein the new instance of the matrix G[n] is computed as a difference between i) an old instance of the matrix G, and
ii) a product of
   a. the a priori error and
   b. the gain vector k, and wherein the inverse correlation matrix P is computed using a recursive least squares (RLS) algorithm transformed into a least squares lattice (LSL) structure which solves P indirectly through a weighted forward linear prediction error covariance matrix F[n] and a weighted backward linear prediction error covariance matrix B[n].

3. The audio system of claim 2 wherein the input signal vector and the output signal vector are in sub-band domain, each instance of the input signal vector is derived from a multi-channel audio frame at a different frame time index n, and wherein each sub-band is treated independently when computing the weighted forward linear prediction error covariance matrix F[n] and the weighted backward linear prediction error covariance matrix B[n].

4. The audio system of claim 2 wherein the derevberation processor is configured to compute the inverse correlation matrix P using the LSL structure, by propagating angle normalized error for forward-backward prediction and joint process estimation.

5. The audio system of claim 2 wherein the dereverberation processor is configured to compute the weighted forward and backward linear prediction error covariance matrices F[n] and B[n], using the LSL structure, using a Gram-Schmidt orthogonalization process.

6. The audio system of claim 5 wherein use of the Gram-Schmidt orthogonalization process transforms a full inverse of F[n] to a triangular one, and a full inverse of B[n] to a triangular one.

7. The audio system of claim 2 wherein the dereverberation processor is configured to combine forward-backward linear prediction and joint process estimation to reduce complexity when computing the weighted forward linear prediction error covariance matrix F[n] and the weighted backward linear prediction error covariance matrix B[n].

8. The audio system of claim 2 wherein the dereverberation processor is configured to combine forward-backward linear prediction and spatially averaged output power estimation to reduce complexity when computing the weighted forward linear prediction error covariance matrix F[n] and the weighted backward linear prediction error covariance matrix B[n].

9. The audio system of claim 2 wherein the dereverberation processor is configured to change length or order of the MCLP filter coefficient matrix G, based on monitoring backward linear prediction energy, wherein when the backward prediction energy increases above a threshold the de-reverb processor stops its computation of higher order solutions for the re-weighted cost function.

10. The audio system of claim 2 wherein the input signal vector and the output signal vector are in sub-band domain, each instance of the input signal vector is derived from a multi-channel audio frame at a different frame time index n, and wherein each sub-band is treated independently when computing the weighted forward linear prediction error covariance matrix F[n] and the weighted backward linear prediction error covariance matrix B[n], and wherein the dereverberation processor is configured to compute the inverse correlation matrix P using the LSL structure, by propagating angle normalized error for forward-backward prediction and joint process estimation, compute the weighted forward and backward linear prediction error covariance matrices F[n] and B[n], using the LSL structure, using a Gram-Schmidt orthogonalization process, combine forward-backward linear prediction and spatially averaged output power estimation to reduce complexity when computing the weighted forward linear prediction error covariance matrix F[n] and the weighted backward linear prediction error covariance matrix B[n], and change length or order of the MCLP filter coefficient matrix G, based on monitoring backward linear prediction energy, wherein when the backward prediction energy increases above a threshold the de-reverb processor stops its computation of higher order solutions for the re-weighted cost function.

11. The audio system of claim 1 wherein the noise reducer comprises:

a parametric multi-channel Wiener filter having a multi-channel filter input to receive the plurality of dereverberated signals and a multi-channel filter output;

a speech presence probability (SPP) estimator that receives an a priori speech presence probability, a priori SPP, and in response configures filter coefficients of the Wiener filter; and a multi-channel voice activity detector (MVAD) to compute the a priori SPP by comparing a) a multichannel SNR level at the plurality of dereverberated signals to b) first and second thresholds, wherein each threshold is being continuously updated by tracking the minima of the instantaneous and averaged multichannel SNRs at each subband.

12. The audio system of claim 11 wherein the noise reducer is to compute a) the first threshold from an instantaneous a priori SNR of the plurality of dereverberated signals, and b) the second threshold from an average a priori SNR of the plurality of dereverberated signals.

13. The audio system of claim 12 wherein the noise reducer computes an average across a plurality of sub-bands of the instantaneous a priori SNR, and finds the sub-band having the smallest SNR across the plurality of sub-bands of the instantaneous a priori SNR.

14. The system of claim 1 wherein the BSS processor is configured to use Householder recursive least square-based independent vector analysis for source separation, in which an inverse of the square root of a covariance matrix of each source is recursively updated.

15. The system of claim 1 wherein the acoustic echo canceller, the dereverberation processor, the noise reducer, the beamforming processor, the residual echo suppressor, the BSS processor, and the speech stream selector are implemented as a processor that is to execute instructions stored in memory, inside an external housing of a smartphone, a tablet computer, a laptop computer, a desktop computer, a speaker dock, a stand-alone wireless loudspeaker cabinet, or an in-vehicle infotainment system.

16. A method for real-time multi-channel speech signal enhancement comprising:

reducing echo in a plurality of microphone signals, to produce a plurality of echo-cancelled signals;

reducing reverberation in the echo-cancelled signals, or in the microphone signals when there is no media playback, to produce a plurality of dereverberated signals;

reducing noise in the plurality of dereverberated signals to produce a plurality of noise-reduced signals;

producing a pickup beam signal from the plurality of noise-reduced signals;

reducing residual echo in the pickup beam signal to produce a residual echo suppressed signal;

extracting a plurality of concurrent audio signals from the dereverberated signals; and selecting one of the plurality of concurrent audio signals or the residual echo suppressed signal.

17. The method of claim 16 wherein said echo in the microphone signals is due to sound from a media playback device.

18. The method of claim 16 wherein reducing reverberation comprises computing an inverse correlation matrix P using a recursive least squares (RLS) algorithm transformed into a least squares lattice (LSL) structure which solves P indirectly through a weighted forward linear prediction error covariance matrix and a weighted backward linear prediction error covariance matrix.

* * * * *